3,281,498
VINYL PLASTISOLS HAVING POLYCARBOXYL CONTAINING POLYESTERS AS PLASTICIZERS
Nathaniel L. Watkins, Jr., Maplewood, and Richard M. McCurdy, East Oakdale Township, Washington County, Minn., assignors to Minnesota Mining and Manufacturing Company, St. Paul, Minn., a corporation of Delaware
No Drawing. Original application May 13, 1960, Ser. No. 28,843, now Patent No. 3,182,041, dated May 4, 1965. Divided and this application Apr. 14, 1964, Ser. No. 370,141
4 Claims. (Cl. 260—873)

This application is a division of copending application Serial No. 28,843, now Patent No. 3,182,041, filed May 13, 1960, which is a continuation-in-part of copending application S.N. 803,577, now Patent No. 3,182,040, filed April 2, 1959.

This invention relates to resinous compositions and in one aspect to cured or cross-linked polymers. In another aspect, this invention relates to low molecular weight polymer chains containing more than two active sites for cross-linking purposes.

Processes for converting liquid polymers to solid elastomers or rubbers have been suggested. The elastomeric properties of polymers depend essentially upon the "backbone" of the system and upon the molecular weight. In order to assure adequate strength and elongation in a rubber, it appears to be essential that the curing of the liquid polymer which forms the starting material for the preparation of the rubber be accomplished chiefly by chain-extension rather than by random cross-linking. Chain-extension connects reactive end groups together, thus increasing primary molecular weight and creating a larger regular molecule composed of smaller units. In random cross-linking, however, the units in the final polymer molecule are not so regularly spaced and contain many loose ends (not terminally connected) which plasticize the molecule rather than add to its strength. Chain-extension preserves the essential elastomeric character of the final polymer and enables high tensile strength and a high degree of elongation to be "built into" the resulting polymer.

Heretofore, three types of rubber have been proposed from liquid prepolymers by the method of chain-extension. These substances include the polysulfide elastomers, polyesters and polyethers cured with diisocyanates, and polyesters containing a carboxyl group on one end of the chain which have been chain-extended with diepoxide resins. Generally speaking, however, all three types of elastomers and the methods for their preparation have inherent disadvantages. Thus, for example, the polysulfide rubbers are relatively unstable with respect to their mechanical properties, particularly at elevated temperatures. Systems cured with isocyanates are sensitive to moisture during preparation and in addition, the isocyanate components have very irritating physiological effects. During curing, the formation of gas and consequent sponging of the composition is commonly observed and is obviously disadvantageous. The resulting rubbers soften severely at elevated temperatures and have very poor adhesion to metals when cured. Polyester resin chain-extensions require relatively long curing times at elevated temperatures and the resulting rubbers are rather stiff with poor elastomeric properties.

In spite of all of the shortcomings of the above systems and because of the great need for liquid elastomers which can be cured to produce dense solvent-proof masses with moderate strength and extensibility, desirably within a period of from about one to four days after application, such substances have found considerable use in the past, particularly in the field of sealants for aircraft.

The object of this invention is to provide a new low molecular weight polyester.

Another object of this invention is to provide a cured elastomer having superior heat stability and solvent resistance together with good flexibility at low temperatures.

Another object of this invention is to provide a new fabric coating composition and fabrics coated therewith.

Still another object of this invention is to provide leather coated and impregnated with a new composition useful, for example, as scuff-resistant compositions on shoes.

Still another object of this invention is to provide aqueous dispersions or emulsions of a new curable low molecular weight polyester.

Yet another object of this invention is to provide a process for producing new low molecular weight polyesters.

Another object of this invention is to provide a process for cross-linking or vulcanization of low molecular weight polymers.

Another object of this invention is to provide a composition which is useful as a plasticizer.

Various other objects and advantages will become apparent to those skilled in the art from the accompanying description and disclosure.

In accordance with the invention, it has been found that a novel low molecular weight polyester polymer containing more than two carboxyl groups can be cured to produce elastomers which have highly advantageous properties. Such elastomers have a high degree of heat stability while retaining desirable mechanical and chemical properties at high temperature. They have excellent solvent resistance and are flexible at low temperature. They are relatively insensitive to moisture and can in most instances be mixed and compounded in simple, open mixing equipment rather than closed containers or rubber mills; and they may be cast in inexpensive open molds, rather than high pressure and/or high temperature molds. When thus cast, they may be cured at surprisingly low temperatures, often at room temperature and when so cured, they are remarkably free from gas formation; yet they have useful pot life in spite of their low temperature curing properties. No significant toxicity problem appears to arise in connection with their production. The systems are characterized further by requiring no solvents, so that they can be prepared as mixtures containing 100 percent solids-forming components. When coated on fabrics, paper and leather for such uses as in lightweight tarpaulins, radomes, electrical insulation, collapsible storage and shipping containers, protective clothing and shoes, upholstery, etc., they form tough, flexible coatings which are superior to the presently used neoprene and vinyl fabric coatings in both low temperature flexibility and in abrasion resistance. The new low molecular weight polymers of this invention can be used as plasticizers, such as in combination with a curing agent to plasticize other synthetic plastic materials, such as vinyl plastics. Also, the new polymer of this invention can be readily handled and applied to surfaces in the form of organic solutions or as water emulsions or dispersions.

The new low molecular weight composition of the present invention comprises a polymer of a diol, a dibasic acid and a polyfunctional compound containing at least three functional groups. The polyester of the present invention is prepared by reacting together the above components at a temperature of about 100 to about 220° C. at atmospheric or elevated pressure until the reaction is substantially complete as evidenced by the production of approximately the theoretical amount of water of esterification of the reaction. The temperature of reaction should be maintained below that temperature where the particular polyester product will decompose. The reaction may be carried out in the presence of an inert organic solvent to increase mobility of the product mixture and thereby insure completion of the reaction. Suitable organic solvents include the aromatic hydrocarbons, such as benzene, cyclic ethers, such as dioxane and tetrahydrofuran, and the ketones, such as methyl isobutyl ketone. In one embodiment of the invention, the diol and diacid may be prereacted together and the resulting product then reacted further with the polyfunctional component.

The amount or proportion of the specific monomers of the initial reaction mixture is critical to obtain the low molecular weight polyester of the present invention which has on the average more than two carboxyl groups appended to the chain. The major proportion of the functional groups in the reaction mixture provided by the monomers are other than the polyfunctional monomer. In addition, more than half of the total functional groups of the monomers in the reaction mixture must be provided by the carboxyl-containing monomer or monomers. At least about 5 percent and generally not above about 15 percent excess of carboxyl groups over hydroxyl groups must be present in the initial reaction mixture to assure carboxyl termination and proper chain length. In order to provide branched polyesters (i.e., containing a plurality of cross-linking sites) suitable for cross-linking to produce elastomers, between about 1 and about 10 percent of the functional groups of the reaction mixture are provided by the polyfunctional component containing at least three functional groups. The polyfunctional component contains from three to six functional groups per molecule, preferably three to four functional groups per molecule. A portion of the dibasic acid or diol may be replaced with a hydroxy acid or amino acid, thus providing a fourth component of the prepolymer mixture. The polyester polymer of the present invention should contain free carboxyl groups attached to the chain since hydroxyl groups do not generally possess the activity necessary for moderate low temperature vulcanization or cross-linking.

Mixtures of the various reactive components may be used without departing from the scope of this invention. For example, two or more diols may be used as the diol component. Also, two or more dibasic acids or two or more trifunctional components may be used.

In one embodiment of this invention, the polyester may be prepared by substituting a hydroxy acid for both the diol and diacid; in which case the reaction mixture is composed of a hydroxy acid and the polyfunctional compound having at least three carboxyl groups.

The diol component of the prepolymer is an aliphatic diol in which the carbon chain may or may not be interrupted with oxygen, sulfur, nitrogen, or an aromatic group, such as a phenyl group. Typical examples of suitable diols include neopentyl glycol (2,2-dimethyl-1,3-propanediol), diethylene glycol, polyethylene glycols (200 to 4,000 molecular weight), 2,2-bis[4-(2-hydroxypropoxy)phenyl]-propane, 1,2-propylene glycol, 3-methyl-3-azapentandiol-1,5, di-1,4-(2-hydroxypropoxy)-benzene, 1,4-butylene glycol, 2,2-diethyl-1,3-propanediol, polypropylene glycols (200 to 4,000 molecular weight), polybutylene glycols (200 to 4,000 molecular weight), 1,1,5,5-tetrahydroperfluoropentane diol, and tetrahydroperfluoroether glycol.

The dibasic acid component of the polyester of this invention includes both aliphatic and aromatic dibasic acids in which the hydrocarbon chain of the aliphatic acid may or may not be interrupted with oxygen or sulfur. Suitable examples of dibasic acids include succinic acid, adipic acid, glutaric acid, diglycolic acid, thiadipropionic acid, oxydipropionic acid, azelaic acid, sebacic acid, fumaric acid and maleic acid.

The polyfunctional compound providing the cross-linking sites and having at least three functional groups include polyanhydrides, polyols and polybasic acids. The polyols are aliphatic but may include an aromatic group, such as a phenyl group, interrupting the hydrocarbon chain. The polybasic acids and polyanhydrides include both aliphatic and aromatic compounds. Suitable examples of such polyfunctional compounds containing at least three polyfunctional groups include glycerol, trimethylolpropane, trimethylolmethane, mannitol, pentaerythritol, trimesic acid, tricarballylic acid, benzene tetracarboxylic acid, pyromellitic dianhydride, 1,4,5,8-naphthalene tetracarboxylic dianhydride and cyclohexanetetracarboxylic anhydride.

Suitable hydroxy acids (including lactones) and amino acids which may be used in accordance with this invention include citric acid, 12-hydroxy stearic acid, N-methyl-β-alanine, hydracrylic acid, N-methyl-omega-aminoundecanoic acid, N-methyl-6-aminocaproic acid, and capralactone.

Typical examples of branched polyesters prepared in accordance with this invention include the following combinations: glycerol, neopentyl glycol (2,2-dimethyl-1,3-propanediol) and succinic acid; trimethylolpropane, diethylene glycol, and adipic acid; trimethylolpropane, neopentyl glycol and diglycolic acid; glycerol, diethylene glycol, and adipic acid; trimethylolpropane, polyethylene glycol (200 to 4,000 molecular weight) and thiadipropionic acid; trimethylolethane, diethylene glycol, polyethylene glycol (200 to 4,000 molecular weight) and oxydipropionic acid; trimethylolpropane, 2,2-bis[4-(2-hydroxypropoxy)phenyl]-propane and azelaic acid; mannitol, diethylene glycol and diglycolic acid; pentaerythritol, propylene glycol, sebacic acid, and isophthalic acid; and trimethylolpropane, 3-methyl-3-azapentandiol-1,5 and azelaic acid; trimesic acid, diethylene glycol and adipic acid; citric acid, polyethylene glycol (200 to 4,000 molecular weight) and adipic acid; citric acid, di-1,4-(2-hydroxypropoxy)benzene, fumaric acid and sebacic acid; benzene tetracarboxylic acid, propylene glycol, 1,4-butylene glycol and adipic acid; benzene tetracarboxylic acid, polyethylene glycol (200 to 4,000 molecular weight), and maleic acid; benzene tetracarboxylic acid, 2,2-diethyl-1,3-propanediol, and diglycolic acid, 1,1,5,5-tetrahydroperfluoropentanediol, adipic acid, trimethylolpropane; tetrahydroperfluoroether glycol $$(HOCH_2CF_2CF_2OCF_2CF_2CH_2OH)$$

adipic acid, trimethylolpropane; benzene tetracarboxylic acid, 12-hydroxy stearic acid; polyacrylic acid, hydracrylic acid; pyromellitic dianhydride, polybutylene glycol (200 to 4,000 molecular weight); 1,4,5,8-naphthalene tetracarboxylic dianhydride, polypropylene glycol (200 to 4,000 molecular weight); and diethylene glycol, adipic acid, and pyromellitic dianhydride.

The carboxyl group-containing prepolymers which are cured by the method of the invention are further characterized by being liquid at about 25° or being liquefiable at temperatures up to about 50° C. when devoid of volatiles (i.e. have a maximum viscosity of the order of about 10,000 poises), have an acid content ranging from about 0.1 to about 3 milli-equivalents per gram, and contain an average of more than two carboxyl groups per molecule. It is preferable that these carboxyl group-containing polyester polymers have viscosities of less than 1,000 poises at 25° C., an acid content of from about 0.25 to about 1.5 milli-equivalents per gram, and contain an average of from 2.5 to about 15 carboxyl groups per prepolymer molecule. With controlled polymerization conditions including the reaction mixture composition, the number average molecular weight ($\overline{M}_n$) of the saturated polyester polymer is generally between about 700 and 10,000, and preferably between about 1,500 and about 6,000. While they may contain free hydroxyl groups, the presence of such hydroxyl groups in the polyester polymers is, in general, detrimental for the purposes of the invention because they can undergo ester interchange reactions, causing a chemical stress relaxation in the cured rubber. The polyester polymers used are substantially free from unreacted hydroxyl groups.

As noted, the polyester polymers of the present invention are liquid or liquefiable at temperatures up to about 50° C. and 100 percent solids-forming resins of which the maximum viscosity is of the order of 10,000 poises (less than 1,000 poises preferred). The advantages of such limitations on the polymer are: (1) Little or no shrinkage upon final curing. (2) The liquid form of these polymers is important in processing, i.e., simple mixing equipment may in most instances be used in place of rubber mills and simple open molds may be used in place of high pressure and/or high temperature molds. (3) The liquid form of the polymers makes it more easy to disperse the curing agent into the polymer itself. It is also possible when desired to put solid curing agents into solution with volatile solvents, such as chloroform, and mix this solution with the polymer. The solvent may then be removed by evaporation. (4) No gases are given off during curing, whereby bubble-free resins are obtained. (5) Strong solvent-resistant rubbers can be formed in situ in difficultly accessible spaces, and the like.

The level of the acid concentration of the prepolymer as specified is limited to from between 0.1 and 3.0 milli-equivalents per gram (the preferred range being 0.25 to 1.5 milli-equivalents per gram), because the rate of the reaction between the prepolymer and the curing agent depends upon the concentration of free carboxyl groups available. For example, in certain applications, a curing time of about 2 to 4 days is most desirable. A level of fewer than 0.1 milli-equivalent per gram acid concentration is practically inoperative to produce the desired result. On the other hand, if the upper acid concentration limit of 3.0 milli-equivalents per gram is exceeded, control of the reaction may be lost, resulting in overheating, charring, and even fire. The higher acid concentrations also may reduce pot life or working time to an unfeasible minimum. "Carboxyl," "carboxyl groups" or "free carboxyl groups" means carboxylic acid reactive groups.

The individual molecules of liquid prepolymer must, as stated, contain an average of more than two free carboxyl groups and may contain up to about fifteen carboxyls per molecule. By including more than two free carboxyl groups per chain length, a cured composition is produced, which no longer is capable of viscous flow. The presence of more than fifteen carboxyl groups in the prepolymer molecule unduly shortens the pot life or working time after the curing agent is added and gelation may occur during polymerization. The term "a cured polymer" as used herein implies that the system under discussion falls within the gelation equation concept of Flory ("The Principles of Polymer Chemistry," P. J. Flory, Cornell Press, Ithaca, N.Y., 1953, pages 347 to 397).

As previously stated, the novel polyesters of the present invention may be cured and this may be accomplished by the use of a suitable curing agent which results in the formation of an elastomeric cross-linked polymer. The curing is effected at temperatures between about room temperature (i.e. 220° C.) and about 150° C. The curing may be effected during milling or extrusion, or the cast mixture itself may be oven cured, if desired. With the preferred curing agents of the present invention, curing is effected at moderate temperatures at or about room temperature. In such instances, the curing agent is not added to the curable polymer until the polymer is ready for preforming or fabrication.

Suitable curing agents which may be employed in this invention are alkylenimine derivatives of the formula

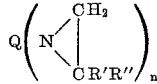

where Q is an *n* valent radical, *n* is 2 or more (preferably 2 or 3), N is linked to an atom having a valence of 4 or 5, and R' and R" are hydrogen or an alkyl group preferably having from 1 to 4 carbon atoms. Q may be an aliphatic, aromatic or alicyclic organic radical which does not contain an active hydrogen but which may contain atoms other than carbon, such as oxygen, sulfur, etc. Q may also be an inorganic radical, such as

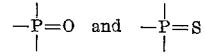

Such phosphorus containing alkylenimine derivatives include, for example, tris(1-aziridinyl) phosphine oxide, tris(1-aziridinyl) phosphine sulfide, N,N-diethyl-N',N"-diethylenethiophosphoramide, N,N' - diethylenbenzene thiophosphondiamide, N-(3-oxapentamethylene)-N',N"-diethylene phosphoric triamide, N,N'-diethylenbenzene phosphondiamide, N,N'-diethylene ethane phosphondiamide, butyl N,N'-diethylenediamidophosphate, N,N-dioctyl-N',N"-diethylenephosphoric triamide, N,N',N"-tris-(1,1-dimethylethylene)phosphoric triamide, etc.

The preferred curing agents employed in preparing the polymers of the invention are substituted polyalkylene amides represented by the following illustrative formulae:

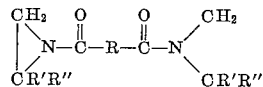

and

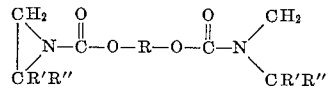

wherein R represents an organic radical, such as an alkylene radical having from 4 to 40 carbon atoms, a 1,3-phenylene radical or a 1,4-phenylene radical, and R' and R" each represent hydrogen or an alkyl radical having from 1 to 8 carbon atoms.

The specific curing agents included within the scope of the above formulae are characterized by properties which permit storage without spontaneous polymerization since they can be produced in substantially pure form, i.e. a product having an azirane ring content of at least 85 percent, usually at least 95 percent, of theoretical. They are controllably reactive and are especially useful for the purpose of chain extension of carboxyl group-containing prepolymers as disclosed herein.

Among the N,N'-bis-1,2-alkylenamides useful as curing agents in accordance with the invention are N,N'-bis-1,2-ethylenadipamide;
N,N'-bis1,2-ethylenipimelamide;
N,N'-bis-1,2-ethylenisosebacamide;
N,N'-bis1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide; and
N,N'-bis-1,2-pentylensebacamide;
N,N'-bis-1,2-ethylenisophthalamide;
N,N'-bis-1,2-butylenisophthalamide;

N,N'-bis-1,2-propylenisophthalamide;
N,N'-bis-1,2-pentylenisophthalamide;
N,N'-bis-1,2-ethylenterephthalamide;
N,N'-bis-1,2-propylenterephthalamide;
N,N'-bis-1,2-butylenterephthalamide; etc.

Mixtures of these monomers may be produced by employing mixed 1,2-alkylenimines.

The N,N'-bis-1,2-alkylenamide curing agents are prepared in monomeric form by the following process: a 1,2-alkylenimine, desirably containing not more than 6 carbon atoms, such as ethylenimine, 1,2-propylenimine, 1,2-butylenimine, 1,2-pentylenimine, etc., is reacted with an aliphatic dicarboxylic acid chloride containing 8 to 20 carbon atoms (e.g. isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride), isophthaloyl chloride or terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 25 percent may be employed.

Desirably, the 1,2-alkylenimine is introduced in an aqueous solution which also contains an alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than 2 carbon atoms, is employed, an alkali-metal bicarbonate, such as sodium, potassium, or lithium bicarbonate may be used as the acid-acceptor instead of a carbonate. This aqueous solution is intimately mixed with the carboxylic acid chloride dissolved in a substantially water-immiscible organic solvent which is chemically inert to both the reactants and the reaction products and in which the resulting N,N'-bis-1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the alkylenamide product by hydrogen chloride formed during the course of the reaction is effectively minimized.

In producing N,N'-bis-1,2-alkylenamides of 1,2-ethylenimine accordingly, pH control of the reaction mixture is more critical than where alkylenimines containing more than 2 carbon atoms are employed. Thus, in such cases it is important to employ an alkali-metal carbonate as the acid-acceptor in an amount sufficient to neutralize all of the hydrochloric acid formed during the reaction of the process and yet maintain the pH of the reaction mixture at about 8.5 or above. With 1,2-alkylenimines containing more than 2 carbon atoms, on the other hand, an alkali-metal bicarbonate may be employed instead of an alkali-metal carbonate as the acid-acceptor, so long as sufficient bicarbonate is present to neutralize all of the hydrochloric acid formed. This phenomenon is believed to be the consequence of the greater reactivity of ethylenimine when compared to those alkylenimines containing more than 2 carbon atoms. The prevention of decomposition of the bis-alkylenamide monomer by the hydrogen chloride formed during the process which this process provides is critical to the production of stable monomer product in useful amounts.

Illustrative of the bis-carbamates which are useful as curing agents in the present invention are:

N,N'-bis-1,2-ethylene (1,4-butanediol) carbamate;
N,N'-bis-1,2-propylene (1,4-butanediol) carbamate;
N,N'-bis-1,2-butylene (1,4-butanediol) carbamate;
N,N'-bis-1,2-ethylene (diethylene glycol) carbamate;
N,N'-bis-1,2-butylene (diethylene glycol) carbamate;
N,N'-bis-1,2-ethylene (triethylene glycol) carbamate;
N,N'-bis-1,2-propylene (triethylene glycol) carbamate;
N,N'-bis-1,2-butylene (triethylene glycol) carbamate;
N,N'-bis-1,2-ethylene (polyethylene glycol-200) carbamate;
N,N'-bis-1,2-ethylene (polyethylene glycol-400) carbamate;
N,N'-bis-1,2-ethylene (polyethylene glycol-1000) carbamate;
N,N'-bis-1,2-propylene (polyethyleneglycol-1000) carbamate;
N,N'-bis-1,2-ethylene (polyethylene glycol-4000) carbamate;
N,N'-bis-1,2-ethylene (polypropylene glycol-1025) carbamate;
N,N'-bis-1,2-ethylene (polybutylene glycol-500) carbamate;
N,N'-bis-1,2-ethylene [1,1'-isopropylidene-bis-(p-cyclohexanol)] carbamate;
N,N'-bis-1,2-ethylene [1,1'-isopropylidene-bis-(p-phenylenoxy) di-2-propanol] carbamate;
N,N'-bis-1,2-ethylene phenylenoxydiocetamide;
N,N'-bis-1,2-ethylene phenylenoxy carbamate;
N,N'-bis-1,2-ethylene-4,4'-bisphenyl carbamate;
N,N'-bis-1,2-ethylene (1,1'-isopropylidene-bis-phenylene) carbamate;
N,N'-bis-ethylene-resorcinol carbamate, etc.

The preferred aromatic carbamates are represented by the above formula wherein R is 1,3-phenylene, 1,4-phenylene, 1,1'-isopropylidene-bis-phenylene, or 1,1'-isopropylidene-bis-(p-phenylenoxy) di-2-propanol. The preferred aliphatic carbamates are represented by the above formula wherein R is a branched or straight chain alkylene radical having from about 4 to about 40, preferably from about 4 to about 20, carbon atoms.

Generally, their preparation involves the reaction of a 1,2-alkylenimine in a water phase with a solution of a chlorocarbonate of a difunctional alcohol in a water immiscible organic solvent, in the presence of an acid acceptor, at a temperature between about −5° C. and 30° C.

In the preparation of the cured compositions of the invention, the polycarboxyl group-containing polyester prepolymers are employed in liquid form, and if necessary may be warmed slightly to liquefy them. To the selected liquid polycarboxyl prepolymer is then added the curing agent which is to be employed. While an amount of the curing agent which is equivalent stoichiometrically to the number of carboxyl groups present may be employed, and some desirable curing effects can be obtained with even smaller amounts, full cures are effected when amounts greater than stoichiometric amounts are employed, ranging upwards from 10 to 100 percent greater; and it is ordinarily preferred that about 20 to 40 percent excesses of the theoretical stoichiometric equivalent of the curing agent be used in order to compensate for any inerts in the curing agent, its adsorption on and reactivity with fillers, etc. The cure is initiated as soon as the two components are mixed. The rate of cure is dependent to a degree upon the temperature, the viscosity of the mixture and the amount of the curing agent which is employed. Obviously, by maintaining the mixture at low temperatures, for example, about 0–10° C., the polymerization is retarded and increased pot life is obtained.

Other curing agents which may be utilized in curing the polyester of this invention include divinyl ether, epoxy resins and diisocyanates. An example of a suitable epoxy resin curing agent are those resins prepared from epichlorohydrin and polyhydric phenols, such as 2,2-bis-(p-hydroxy phenyl)propane. Among the polyisocyanates which may be used as cross-linking agents are methylene di-p-phenyl diisocyanate, hexamethylene diisocyanate, and 4-methyl-m-phenylene diisocyanate.

If desired, fillers can be added to the composition before curing, as well as dyes or other substances which may be considered as adjuvants and the like; for example, accelerators, antioxidants, and catalysts. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of bis-amide curing agent).

The polyester of this invention can be conveniently handled and applied to surfaces from aqueous dispersions or emulsions. It has been found that the polyesters may be suspended in aqueous medium in an amount between about 10 and about 50 weight percent based on water. The cross-linking agents, such as the polyalkylenamides hereinbefore described, can be included in the dispersion together with fillers, pigments, and dispersing and emulsifying agents which are present in an amount of about 1 to 15 weight percent. Suitable dispersing agents include potassium oleate, sodium stearate, sodium lauryl sulfate, sodium salt of long chain alkyl sulfonates derived from kerosene, ammonium salt of perfluorooctanoic acid, lithium salt of perfluorooctane sulfonic acid, potassium salt of N-ethyl-N-perfluorooctanesulfonyl glycerine, and ethylene oxide derivatives of alkylated phenols. These emulsifying agents are usually included in an amount between about 1 and about 10 weight percent based upon the water content of the dispersion. The dispersion is prepared by adding the polyester and the other ingredients either together or successively to the aqueous medium during agitation. In some instances, an organic solvent, such as toluene, is used as a means for dissolving the curing agent or the polyester and aiding in the dispersion of these components in the aqueous medium. Dispersions made in accordance with the above may be utilized for coating surfaces or for making up compositions which include other materials, such as in paper making or for the saturation and treatment of fabrics and paper.

A long standing need in vinyl plastisol technology has been a non-migratory plasticizer which up grades the overall properties of the vinyl plastic. The polyester of the present invention, either alone or when cured, enhances the properties of the vinyl plastic and satisfies the above requirements. The polyester with or without the appropriate curing agent is incorporated in the vinyl plastic by extrusion or admixing by other conventional methods, and thereafter the admixture may be cured at ambient or at an elevated temperature if necessary. The resulting integral rubbery polyester phase is a good plasticizer for the vinyl plastic. The proportion of the polyester in such a plasticization admixture is usually between about 30 and about 85 percent by weight of the total mixture to be plasticized. The resulting plastisol evidences improved physical properties, ease of processing, flame resistance, thermal stability and non-migration of the plasticizer or cured rubber. Various useful products can be prepared from the plastisol, such as coated fabrics, adhesives, electrical insulation, molded goods and articles and sealants. Typical fabrics which can be coated include saran, Dacron and nylon. The vinyl plastics or resins which may be plasticized with the polyesters of this invention include polymers and copolymers of vinyl chloride, vinyl fluoride, vinyl acetate, vinylidene chloride, vinylidene fluoride, styrene, vinyl ether, maleic anhydride, butadiene, vinylpyrrolidine, and trifluorochloroethylene. For example, elastomeric copolymers of trifluorochloroethylene with vinylidene fluoride and perfluoropropene with vinylidene fluoride are plasticized with the polyester polymers of this invention. The resulting plasticized product of these vinyl polymers is a network of rubbery polyester inseparably entwined with the high molecular weight vinyl plastic. When cured, the polyester which acts as a plasticizer is completely nonextractable.

As previously stated, the polyesters of this invention can be applied to various surfaces, such as synthetic fabrics, paper, and metal, but one of the most unique and best applications of the polyesters is to leather surfaces either as an impregnant or as a coating. Leather which may be treated with the polyester of this invention and then cured includes cowhide, pigskin, and alligator hide. Such finished or coated leather may be used for shoes, shoe soles, pocketbooks, belts, industrial gaskets and seals, harnesses, saddles, briefcases, luggage, table tops, chairs, gloves, coats and jackets. The leathers coated with the polyesters and cured are tough and scuff-resistant. Such leathers are also waterproof. The flex properties and general appearances of the leather are not effected by the cured polyester coating. The polyester may also be utilized as a primer coat or adhesive coat for leather when cured in situ. Generally, the dry tanned leather is mechanically worked to render it supple. Next, the pigment coats are applied usually from water dispersions in a natural or synthetic resin. The pigment is usually included in the resin and then dispersed in the aqueous medium. Natural resins include shellac or albumin but may be replaced with synthetic acrylic or urethane resins. The top coat is then applied also from a water dispersion. This top coat in accordance with this invention is an aqueous dispersion of the polyester and curing agent with or without dyes, pigments or fillers, such as titanium dioxide, aniline dyes and powdered metals. The polyester and curing agent may be applied also without dispersing in water or solvents since the polyester is usually liquid in form. The coats may be applied by spraying, swabbing or brushing. Leather impregnated with either an aqueous dispersion or organic solution of the polyester and curing agent is useful in providing toughness and wearability to the leather. Impregnation is effected with the desired tanned leather prior to the application of the various pigment and top coatings.

The following examples are offered as a better understanding of the present invention and are not to be construed as unnecessarily limiting thereto. The examples relate to the preparation of the polyester, the curing of the polyester and the use of the polyester for various purposes and in various compositions. The proportions shown in parts are parts by weight.

*Example I*

This example is a bulk preparation of a saturated polyester of adipic acid, diethylene glycol and trimethylolpropane. About 584 grams (4.0 mols) of adipic acid, 388 grams (3.7 mols) of diethylene glycol, 12.44 grams (0.09 mol) of trimethylolpropane and 2 grams of a triphenyl phosphite catalyst were charged to a stirred flask. The reaction mixture contained 5 percent excess of carboxyl groups over hydroxyl groups and 1.8 percent of these functional groups were provided by the trimethylolpropane. The reaction was carried out at 160–180° C. in a nitrogen atmosphere. When approximately the theoretical amount of water of esterification was driven off (indicating that the reaction is essentially complete) the pressure was reduced gradually and the temperature was increased to 220° C. The reaction was terminated when the acid number of the melt reached 27.9. The characteristics of the polyester are as follows:

Inherent viscosity in acetone _____ 0.13
Number average degree of polymerization ($\overline{X_n}$) _____ 50
Molecular weight ($\overline{M_n}$) (average) _____ 5000
Free carboxyl groups per molecule (average) _____ 2.6
Acid concentration (milliequivalents per gram) _____ 0.50

*Example II*

This example is a bulk preparation of a polyester of adipic acid, diethylene glycol and glycerol. About 146 grams (1.0 mol) of adipic acid, 85.5 grams (0.80 mol) of diethylene glycol, and 9.2 grams (0.10 mol) of glycerol were charged to a stirred 250 milliliter flask. The reaction mixture contained 5 percent excess of carboxyl groups over hydroxyl groups and 7.5 percent of these functional groups were provided by the glycerol. The reaction was carried out at 160–180°C. in a nitrogen atmosphere. The bulk of the water of esterification was removed (by distillation) within the first four hours and the remainder was then removed by lowering the pressure and raising the temperature of the reaction to 220° C. About two hundred grams of polymer were recovered. Its characteristics are as follows:

| | |
|---|---|
| Inherent viscosity in acetone | 0.08 |
| Acid number (milligrams of potassium hydroxide per gram of sample) | 58.0 |
| Number average degree of polymerization ($\overline{X_n}$) | 20 |
| Molecular weight ($\overline{M_n}$) (average) | 2000 |
| Free carboxyl groups per molecule (average) | 3.0 |
| Acid concentration (milliequivalents per gram) | 1.04 |

*Example III*

This is an example of an azeotropic preparation of a saturated polyester of sebacic acid, neopentyl glycol and trimethylolpropane. About 202 grams (1.0 mol) of sebacic acid, 89.4 grams (0.9 mol) of neopentyl glycol and 3.7 grams (0.03 mol) of trimethylolpropane were charged to a flask which is fitted with a Barrett trap, a thermometer which is immersed in the liquid reaction mixture and a reflux condenser. The reaction mixture contained 5.2 percent excess of carboxyl over hydroxyl groups and approximately 2.5 percent of these functional groups were provided by the trimethylolpropane. A volume of benzene approximately equal to that of the reaction mixture was added and the liquid was heated to reflux. The refluxing was continued (the water of condensation being removed by the Barrett trap as it is formed) until the distillate becomes clear and the acid number of the polymer approached the theoretical value. The benzene was then removed by distillation. The characteristics of this polyester are as follows:

| | |
|---|---|
| Number average degree of polymerization ($\overline{X_n}$) | 23 |
| Free carboxyl groups per molecule (average) | 2.3 |
| Molecular weight ($\overline{M_n}$) (average) | 2500 |
| Acid concentration (milliequivalents per gram) | 0.94 |
| Acid number | 53 |

*Example IV*

This is an example of a bulk preparation of a saturated polyester of isosebacic acid, neopentyl glycol and trimethylpropane. About 515 grams (2.55 mols) of isosebacic acid, 221 grams (2.12 mols) of neopentyl glycol and 13.5 grams (0.1 mol) of trimethylolpropane were charged to a stirred flask. The reaction mixture contained about 15 percent excess of carboxyl groups over hydroxyl groups and about 3 percent of these functional groups were provided by the trimethylolpropane. The reaction was carried out at approximately 160–180° C. in a nitrogen atmosphere. When approximately the theoretical amount of water of esterification was driven off (indicating that the reaction is essentially complete) the pressure was reduced gradually and the temperature was increased to 250° C. The reaction was terminated when the acid number of the melt reached 60.6. The viscosity of the resulting polyester was found to be 3700 centipoises at 150° F. when measured with a Brookfield viscometer. The molecular weight was about 3000–4000.

*Example V*

This is an example of a bulk preparation of the polyester of trimesic acid, diethylene glycol and adipic acid. About 263 grams (1.8 mols) of adipic acid, 191 grams (1.8 mols) of diethylene glycol, 21 grams (0.1 mol) of trimesic acid and 650 grams of benzene were charged to a stirred flask and refluxed with agitation for about 6 hours. The reaction mixture contained about 8 percent excess of carboxyl groups over hydroxyl groups and about 4 percent of these functional groups were provided by the trimesic acid. The water of condensation which forms during the reaction was removed in a Barrett trap. The benzene was removed at the end of the reaction leaving a mobile liquid polyester of which the acid number was 42 (acid concentration 0.75 milli-equivalent per gram). The molecular weight of the polyester was about 4000.

*Example VI*

This is an example of the preparation and curing of a branched polyneopentylene-sebacate polyester containing carboxyl terminal groups. 1011.2 grams of sebacic acid (5.0 mols), 433.0 grams neopentyl glycol (4.12 mols), and 37.6 grams trimethylolpropane (0.28 mol) were heated together in a 3-neck flask equipped with a nitrogen inlet, a condenser for the removal of water, a stirrer, and a thermometer. The reaction mixture was heated for 4 hours under nitrogen with the temperature gradually increasing from 150° C. to 170° C. which resulted in removal of 75% of the theoretical water. Further heating at 200° C. and 10 m. Hg pressure for an additional 8 hours gave a produce with an acid number of 36.9. The theoretical value is 36.5. The theoretical degree of polymerization is 28.6 and the theoretical free carboxyl groups are 2.85 per average molecule. The reaction mixture contained about 10 percent excess of carboxyl groups over hydroxyl groups and about 4.4 percent of these functional groups were provided by the trimethylolpropane. This polyester when cured in accordance with the following formulations with N,N'-bis-ethylenisophthalamide was tough and rubbery and had the following properties:

TABLE I

| | "A" | "B" |
|---|---|---|
| Formulations: | | |
| Polyester | 100 | 100 |
| N,N'-bis-ethylenisophthalamide (curing agent) | 11.2 | 12.8 |
| Silica (filler) | | 15 |
| Agerite White (stabilizer) (di-beta-naphthyl-para-phenylenediamine) | 2 | 2 |
| Dielectric Properties, Dielectric Properties at 100 cycles: | | |
| Dissipation Factor (percent): | | |
| 30° C | 3.4 | 1.9 |
| 60° C | 24.2 | 2.6 |
| 90° C | (¹) | 29.2 |
| 120° C | (¹) | 40.5 |
| Dielectric constant: | | |
| 30° C | 4.9 | 4.5 |
| 60° C | 5.1 | 3.9 |
| 90° C | | 3.2 |
| 120° C | | 5.1 |
| Dielectric Strengths, Volts/mil | 1,280 | 900 |

¹ Too high to measure.

As can be seen from the data, the use of a silica filler improves the electrical insulating properties of this system. Heat aging of these specimen in air at 220° C. for 240 hours in no way impaired their physical or electrical properties.

*Example VII*

This is an example of the preparation and curing of a branched polyneopentylene - sebacate-isophthalate polyester containing carboxyl terminal groups. 463.0 grams of sebacic acid (2.29 mols), 41.5 grams isophthalic acid (0.25 mol), 222.0 grams neopentyl glycol (2.13 mols), and 19.6 grams trimethylolpropane (0.146 mol) were heated together in a 3-neck flask equipped with a nitrogen inlet, a condenser for the removal of water, a stirrer, and a thermometer. The reaction mixture was heated for 4 hours under nitrogen with the temperature gradually increasing from 150° C. to 170° C. at which time 70% of the theoretical amount of water had been collected. Further heating at 200° C. and 10 mm. Hg pressure for an additional 8 hours gave a product with an acid number 39.0, some neopentyl glycol distilling out during this period, since theoretical acid value is 32.4. The reaction mixture contained 8.1% excess of carboxyl groups over hydroxyl groups and about 4.5% of the functional groups were provided by the trimethylolpropane. The charge used should theoretically give a polyester with about 3.3 carboxyl groups per average molecule, and a molecular weight of about 6,000. This polyester when cured with a 1.6 to 1 equivalent ratio of N,N'-bis-ethylenisophthalamide to carboxyl groups gave a tough rubbery material with the following dielectric properties:

|  | Dissipation Factor, Percent | Dielectric Constant |
|---|---|---|
| 30° C | 3.4 | 4.2 |
| 60° C | 5.7 | 4.1 |
| 90° C | 21.8 | 4.4 |

The dielectric strength of this cured material was about 1000 volts per mil.

*Example VIII*

Polyesters prepared from various glycols and diacids in a manner similar to that described in Examples VI and VII and cured with N,N'-bis-ethylenisophthalamide to tough rubbery products had the following dielectric properties:

| Polyester | Neopentylene Isosebacate | Neopentylene azelate | Neopentylene adipate |
|---|---|---|---|
| Dissipation Factor (Percent): |  |  |  |
| 30° C | 4.5 | 42.0 | 5.6 |
| 60° C | 31.0 | 31.0 | 32.0 |
| 90° C | off scale |  |  |
| Dielectric Constant: |  |  |  |
| 30° C | 6.0 | 4.9 | 4.9 |
| 60° C | 7.5 | 5.5 | 5.1 |
| 90° C |  |  |  |
| Dielectric Strength (volts/mil) | 970 | 900 | 950 |

The trifunctional component of the reaction mixture for the above polyesters was trimethylolpropane.

*Example IX*

About 100 parts of the adipic acid-diethylene glycol-trimethylolpropane polyester of Example I above and 25 parts of carbon black (Philblack O) were mixed on a three roll Day paint mill at room temperature until the mixture became homogeneous. About 16 parts by weight of N,N'-bis-1,2-ethylenisosebacamide were added at room temperature and the mixture was stirred vigorously.

This viscous, filled polymer mixture was applied with a caulking gun to a 17-7 stainless steel surface (such as is found in aircraft fuel cells) and was allowed to cure at room temperature. After three days it was tack free as measured by the clean release of polyethylene film which was pressed against its surface.

A series of comparative tests were run as shown, infra. A commercial aircraft sealant based on liquid polysulfide polymer which is representative of the best material presently available commercially for sealing aircraft fuel cells was included for the purpose of comparison. This material was based upon a liquid polysulfide polymer which is a thiol-terminated liquid polymer of bis(ethylenoxy) methane having a viscosity at 25° C. of 350–450 poises, a number average molecular weight of 4000 and a pour point of 35° F. and which is available commercially from the Thiokol Corporation of Trenton, N.J. under the trade designation "LP-2," and containing fillers, curing agents and the like to produce an elastomer.

TABLE II

|  | Bis-Amide Polyester Sealant | Commercial Polysulfide-based Aircraft Sealant |
|---|---|---|
| After A Cure Cycle of 2 Weeks at Room Temperature: |  |  |
| Tensile Strength, p.s.i.[1] | 425 | 160 |
| Elongation, percent [1] | 95 | 155 |
| Scott brittleness, $T_B$, ° F. (ASTM D 764-52T) | −40 | −40 |
| Gehman $T_{10}$, ° F. (ASTM D 1053-52T) | −40 | −49 |
| Shore Hardness, A-2 (ASTM D 676-49T) | 55 | 45 |
| Percent Volume Swelling After 1 Week Submerged in the Following Liquids at 160° F. (ASTM D 471-52T): | Polyester | Polysulfide |
| JP-4 Jet Fuel of MIL-F-7914 (Aer) | 12.5 | −19.1 |
| Water | 0.0 | 48.0 |
| Skydrol 500 (phosphate ester hydraulic oil) | 140.0 | Dissolves |
| OS-45 Coolant (silicate ester fluid) | 3.0 | −12.5 |
|  | Bis-Amide Polyester Sealant | Commercial Polysulfide-based Aircraft Sealant |
| Aged 1 Week at 350° F. in Air: |  |  |
| Tensile Strength, p.s.i. | 344 | (1) |
| Elongation, Percent | 70 | (2) |
| Shore Hardness, A-2 | 60 | >100 |
| Weight Loss, Percent | 9.8 | >50 |

[1] Tensile and elongation—dumbbell specimens (0.5" by 0.125" between bench marks) 0.05" thick at jaw separation rate of 2"/min. Test values correlate with those from ASTM D 412-51T.
[2] Too brittle to test.

It was noted that the cured polyester sealant was still operative as a rubbery sealant after 168 hours at 350° F., and the polysulfide-based sealant had completely lost its rubbery properties and had become useless. The fuel resistance of the cured polyester sealant was also superior to that of the polysulfide sealant.

The compositions of the invention were also useful for treating initially porous fibrous webs. About 300 parts of a similar diethylene glycol-adipate-trimethylolpropane polyester (acid content of about 0.73 milli-equivalent per gram, number average degree of polymerization 40, molecular weight 4050), 38.11 parts of N,N'-bis-1,2-ethylenisosebacamide, 3.0 parts of a symmetrical di-beta-naphthyl paraphenylene diamine antioxidant (Agerite White, a product of R. T. Vanderbilt Co.) and 45.0 parts of a silica filler (Cabosil, a product of Godfrey L. Cabot, Inc.) were mixed thoroughly. The mixture was knife-coated onto several different woven cloths (the knife coater being set at .018 inch in each case). Each lot of coated cloth was doubled over, subjected to a pressure of about one pound per square inch over the area of contact and cured tack free in 25 minutes at 250° F. One inch wide test pieces were cut from each lot and the ends of each test piece (which were not adhered together) were clamped in the jaws of a tensile testing machine. The cloth-to-polymer adhesions were tested by determining the force required to separate them at a rate of 20 inches per minute, the adhered double thickness of cloth being held at 90° to the direction of jaw separation. The following adhesion values were obtained (in pounds per inch of width):

Polyethylene _____ 8.8
Nylon (4 oz. per square yard cloth weight) _____ 8.6
Nylon (5½ oz. per square yard cloth weight) _____ 7.5
Glass cloth _____ 5.0

Comparable test values of commercial vinyl coated nylon fabric run from one to two pounds per inch of width.

*Example X*

A series of diethylene glycol-adipate-trimethylolpropane polyesters were prepared by the method used in Example I hereinabove. The purpose was to compare them for effects of branching, molecular weight and filler loading on physical properties. The polyesters are as follows:

TABLE III

| Lot | A | B | C | D |
|---|---|---|---|---|
| Number Average Degree of Polymerization ($\overline{X}_n$) | 9 | 16 | 19 | 50 |
| Branches per Molecule ($\beta$) | 1.0 | 0.5 | 1.0 | 1.0 |
| Monomer Units per Branch ($\overline{X}_n/\beta$) | 9 | 32 | 19 | 50 |
| Inherent Viscosity (in acetone) | .07 | .08 | .12 | .13 |
| Free carboxyl groups per Molecule (average) | 3.0 | 2.5 | 3.0 | 3.0 |
| Acid Content (milli-equivalents H+ per gram) | 3.06 | 1.43 | 1.38 | 0.623 |

About 100 parts of each polyester and 45 parts of carbon black (Philblack O) were mixed on a three-roll Day paint mill at room temperature until the mixture in each case became homogeneous. A 30% mol excess of N,N'-bis-1,2-ethylenisosebacamide (based on the free carboxyl group concentration in each polyester) was added to each at room temperature and the mixtures were stirred vigorously and molded into flat sheets. A firm, low-tack rubber was formed by Lot A after standing for 6 hours, by Lots B and C after standing for 24 hours and by Lot D after standing for 3 days (all at room temperature).

TABLE IV

| Lot | A | B | C | D |
|---|---|---|---|---|
| Tensile Strength, p.s.i. | 800 | 1,650 | 1,300 | 1,275 |
| Elongation, percent | 75 | 195 | 110 | 450 |
| Scott brittle point, $T_B$, °F | −24 | −31 | −29 | −60 |
| Percent Volume Swelling After Being Submerged in 70% Isooctane, 30% Toluene Fuel for 48 Hours at 70° F | 7 | 24 | 15 | 15 |

*Example XI*

About 100 parts of an acid-terminated polyester of adipic acid, diethylene glycol and trimethylolpropane (prepared according to the procedure of Example I above) which had an acid number of 52 and which contained an average of 2.6 free carboxyl groups per molecule were mixed with 15 parts of N,N'-bis-1,2-propylenterephthalamide and the mixture was heated with agitation until solution was complete. The resulting viscous liquid was then cured for one hour at 350° F. to form a somewhat soft, tacky rubber.

*Example XII*

An acid-terminated polyester of 131.5 grams (2.0 mols) of adipic acid, 77 grams (1.6 mols) of diethylene glycol and 8.35 grams (0.21 mol) of trimethylolpropane was prepared according to the procedure of Example I above. This polyester contained an average of 3.0 free carboxyl groups per molecule, had an acid number of 53 (corresponding to an acid content of 0.95 milli-equivalent per gram), a number average degree of polymerization ($\overline{X}_n$) of 27, and an inherent viscosity in acetone of 0.105.

About 100 parts of the polyester, 15.2 parts of N,N'-bis-1,2-ethylenisosebacamide, 5 parts of Valron Estersil (a reinforcing grade silica surface-reacted with butyl alcohol), 5 parts of titanium dioxide filler and 1 part of liquid antioxidant (liquid phenolformaldehyde A-stage resin; a product of C. P. Hall Co.) were mixed thoroughly, the mixture was coated on woven glass cloth, the coated cloth was cured for 10 minutes at 300° F. and stored at room temperature. It was tack free in from 3 to 5 days. This coated fabric had excellent heat and solvent resistance. Its abrasion resistance was far better than presently used fabric coatings, e.g. vinyls (as measured on MIL-C-7719) and it passed the flexibility tests of MIL-C-7719 at −90° F. It may be given any of a wide variety of colors by varying the fillers and pigments used since the polyester and its curing agent were both nearly colorless.

*Example XIII*

The polyester from Example VI was evaluated as an electrical sealing compound. Since the aromatic structure of the curing agent is of key importance in achieving low power factors, a series of experiments with the liquid N,N'-bis-1,2-propylenterephthalamide were carried out. The terephthalamide was compared with the isophthalamide curing agent of Example VI in neopentyl sebacate elastomers and several scavengers for impurities also evaluated as shown in the following Table V. Most promising was a dicumyl peroxide treatment of the polyester prior to compounding and curing with the terephthalamide.

TABLE V

| Compounds (Pts. by Wt.) | A | B | C | D | E | F |
|---|---|---|---|---|---|---|
| Polyneopentyl sebacate | 100 | 100 | 100 | 100 | 100 | |
| Hyar 1300 × 2 | | | | | | 100 |
| Terephthalamide Curing Agent | | | | 18.7 | | |
| Isophthalamide Curing Agent | 11 | 11 | 11 | | 11 | 25 |
| Sodium adipate | | | | 0.2 | 0.2 | |
| Elastopar (N-methyl-N-4-dinitrosoaniline) [1] | | 5 | | | | |
| DiCup 40C (40% dicumyl peroxide; 60% calcium carbonate) [1] | | | 2 | | | |
| Total Cure: 12 hours at 150° C. | | | | | | |
| Evaluation: at 100 cycles, 25° C., 50% RH. | | | | | | |
| Thickness, mils | 45 | 55 | 35 | 38 | 57 | 147 |
| Loss factor | 0.47 | 0.47 | 0.36 | 0.46 | 0.57 | 0.65 |
| Dielectric Constant | 9.4 | 8.9 | 3.9 | 9.0 | 9.3 | 35 |

[1] These chemicals were employed by pretreating the polyesters with them for two hours at 150° C. prior to adding the curing agent.

In this experiment, Hycar 1300×2 (a liquid terpolymer of butadiene, acrylonitrile and methacrylic acid) was substituted for the polyester in formulation F. As shown in the table, its electrical properties are inferior to the polyester elastomers; furthermore, it is much inferior in heat aging and low temperature properties to the polyneopentyl sebacate elastomer.

The trifunctional compound in the preparation of the above polyesters was trimethylolpropane.

*Example XIV*

A carboxyl-terminated neopentyl n-sebacate polyester having an acid number of 38.6, an average molecular weight of 2600 and for which the calculated average number of free carboxyl groups per molecule is 3.2 was prepared according to the general procedure of Example III above. A solution of 12.8 parts of N,N'-bis-1,2-ethylenisophthalamide in about 50 parts of acetone was mixed with 100 parts of the polyester and 15 parts of a silica filler (Cabosil, a product of Godfrey L. Cabot, Inc.) was added. The resulting mixture, which is designated Lot A, was diluted to approximately 50% solids with toluene.

An acid-terminated neopentyl n-sebacate-isophthalate polyester was prepared according to the same general procedure. This polyester, in which the mol ratio of the acids used is 90 sebacic acid to 10 of isophthalic acid, had an acid number of 38.9. A solution of 12.0 parts of N,N'-bis-1,2-ethylenisophthalamide in about 50 parts of acetone was mixed with 100 parts of the polyester.

The resulting mixture, which is designated Lot B, was diluted to approximately 50% solids with toluene.

Resin mixtures Lots A and B were used to coat lengths of untreated glass fabric which had been previously heated to further clean its surface. The excess coating of resin was removed, in each case, by pulling the coated fabric between the nip of two rolls. The lots of coated fabric were then allowed to stand at room temperature until the volatile solvents had evaporated and were then cured for 10 minutes at 350° F.

An alternate and equally satisfactory method of preparing the foregoing resin mixtures was by milling the respective bis-amide and polyester ingredients together at room temperature in a paint mill until the former had dissolved in the latter. Fillers could then be added (as in Lot A). The resulting 100% solids-forming liquid mixtures could then be conveniently coated on the glass fabric. This method, in which no solvents were used, is preferred in cases in which solvents may be undesirable, e.g. because of inconvenience of removal, hazard, etc.

The following data was obtained from electrical tests run on the above-described lots of coated glass fabric, which were given the same designations as the resin mixtures from which they were prepared. The tests were run using a 100 cycle per second alternating current.

TABLE VI

|  | Lot A | Lot B |
|---|---|---|
| Dissipation Factor (D) (ASTM-D-150-54T): |  |  |
| 30° C | 0.019 | 0.034 |
| 60° C | 0.026 | 0.057 |
| 90° C | 0.292 | 0.218 |
| Dielectric Constant (K) (ASTM-D-150-54T): |  |  |
| 30° C | 4.5 | 4.2 |
| 60° C | 3.9 | 4.1 |
| 90° C | 3.2 | 4.4 |

The product of the dielectric constant (K) and the dissipation factor (D) is a relative measure of the heat loss accompanying the passage of electrical current. This product and the individual values of (K) and (D) are important in determining whether a material is valuable for use in the electrical insulation field, low values of K, D and of the product of K and D being desired. Materials with dissipation factors in the range of Lots A and B are generally useful in the field of electrical insulation.

In addition to having highly useful electrical properties, these coated fabrics have been found to have excellent resistance to continuously high temperatures and to continuous mechanical flexing. This particular combination of properties renders such coated fabrics extremely useful in electrical insulating tapes, e.g. for use in electric motors, etc. Similarly, if the fabric upon which the resin is coated is in the form of a sleeve (i.e. of circular cross section), it may be used in its coated form as an insulation for electrical cables.

*Example XV*

A water emulsion of a carboxylic acid-terminated polyester (adipic acid diethylene glycol polyester) had been prepared. To this emulsion could be added a curing agent and dispersed along with the polyester emulsion. Such dispersions find wide utility in many areas, such as coatings for wood and metal, treatments for cloth, paper, as beater additives and in addition almost any other application where presently used polymeric emulsions and dispersions and latices are employed. In this example, the emulsion formulation is shown below:

| | Parts |
|---|---|
| Water | 100 |
| Polyester | 20 |
| Toluene | 20 |
| Soap (sodium lauryl sulfate) | 3 |
| N,N'-bis-1,2-ethylenisosebacamide | 4 to 8 |

This formulation was used by addition to paper pulp with a beater. The transparency of the sheet was very good and the tensile strength was increased while the tear strength remained the same on the cured sheet. In addition to the development of good paper properties, the resulting sheet was transparentized.

*Example XVI*

A dispersion prepared from the same formula as employed in paper making of Example XV was also found useful in the making of rubber goods from latex, by electrodeposition. This technique may be employed to manufacture such articles as rubber gloves by plating out the elastomer on a ceramic glove form coated with a conductive layer. In this experiment a 6-volt D.C. supply was connected to a 12 ohm rheostat switch, and two copper electrodes in series. As the current flowed from one electrode to another through the emulsion, the dispersed particles of polyester elastomer plated out and discharged on the anode. It was found that as electrodeposition proceeded current blocking occurred (as film thickness increased on the anode) while the cathode (and rod) remained uncoated. The coated anode was placed in an oven for 20 minutes at 120° C., and cured to a strong elastomer showing that a continuous film of electrodeposited elastomer had been formed from the dispersion.

*Example XVII*

The preparation of scuff-resistant finishes for leather from polyester elastomers can also be achieved from latex or water dispersion. In a typical experiment, a masterbatch was prepared on a paint mill consisting of 100 parts of the polyester of Example XV, 15 parts silica, and 2 parts Agerite White antioxidant. This masterbatch was dispersed in a small amount of water, just enough to allow the coating to be spread freely over the leather surface. The dispersion formulation was 5 parts polyester masterbatch, 1 part bis-ethylenisosebacamide, 1 part toluene, and 1 part water. Coatings of this formulation were spread by hand with a spatula to work it evenly over the leather. The spread coating could be cured by infrared lamps. A firm tack-free abrasion-resistant clear coating results.

*Example XVIII*

The following solution was prepared:

| | Parts |
|---|---|
| Carboxyl-terminated trimethylol-propane-diethylene glycol-adipate polyester | 100 |
| N,N'-bis-ethylenisosebacamide | 25 |
| Toluene | 125 |

This composition was sprayed onto chrome tanned cowhide and allowed to cure three days at ambient temperature. This coating penetrates the leather to produce a rich dark surface of low gloss which is highly scuff-resistant.

*Example XIX*

The following solution was prepared:

| | Parts |
|---|---|
| Carboxyl-terminated trimethylolpropane-diethylene glycol-adipate polyester | 100 |
| Silica filler | 15 |
| N,N'-bis-ethylenisosebacamide | 25 |

This composition was allowed to stand 60 hours at room temperature which results in chain extension of the polymer. This chain extension reaction may be illustrated as follows:

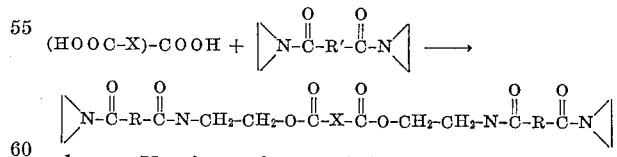

where —X— is a polyester chain segment of diethylene glycol, trimethylolpropane, and adipic acid, having a molecular weight in the range of 1,800 to 2,500 with about 2.5 branches per average molecule.

The chain extension reaction results in the monomeric bis-amide becoming a part of the polymer network. This gives a coating compound with superior "hold-out" qualities, and the resultant coated leather is more glossy, and lighter in color revealing the natural grain of the leather.

Another 140 parts of toluene is then added and the composition is sprayed onto chrome tanned cowhide, and cured three days at ambient temperature.

A comparison of the above described leather coatings with a commercially obtainable finished leather shows that the coatings utilizing the polyesters and curing agents of this invention are superior in abrasion resistance as determined by abrading the coating with the edge of a new coin. The resistance to cracking in flex at room temperature is also superior due to the better flexibility of the elastomer coating.

*Example XX*

A rubbery product having improved tensile strength and low temperature properties was prepared from a suitable carboxyl-terminated polyester as shown below, mixed with a plastisol grade polyvinylchloride, and cured with an N,N'-bis-1,2-alkylenamide. The resulting product is a network of a rubbery polyester inseparably entwined with a high molecular weight polyvinylchloride. The rubber, which acts as a plasticizer, is completely non-extractable, and furthermore, imparts improved thermal stability to the polyvinylchloride.

A cured composition comprising 100 parts of poly(trimethylolpropane-ethylene neopentylene-azelate), 40 parts of Geon 121 (polyvinylchloride), and 11.4 parts N,N'-bis-ethylenisosebacamide had 1,026 p.s.i. tensile strength, 610% elongation, 0% set, and a Gehman $T_{10}$ of —25° C., and a brittle point of —55 to —58° C.

A series of plastisol compositions were prepared from Geon 121 polyvinylchloride, and poly (trimethylpropane-neopentylglycol-sebacate) cured with N,N'-bis-1,2-ethylenisosebacamide as a curing agent. The compositions, and the physical properties of these cured plastisols are listed in the following table.

TABLE VII

| Composition (gms.) | A | B | C | D | E | F |
|---|---|---|---|---|---|---|
| Polyvinylchloride | 7 | 10.5 | 14 | 20 | 28 | 35 |
| Polyester | 35 | 35 | 35 | 35 | 35 | 35 |
| Curing Agent | 5 | 5 | 5 | 5 | 5 | 5 |
| Tensile (p.s.i.) | 440 | 650 | 570 | 750 | 1,069 | 1,720 |
| Elongation at break (percent) | 540 | 560 | 430 | 360 | 340 | 340 |
| Set at Break (percent) | 0 | 0 | 0 | 0 | 0 | 0 |
| Hardness: Shore A-2 | 25 | 31 | 35 | 48 | 57 | 65 |
| Low Temp. Flex (° F.) Gehman $T_{10}$ | —16.6 | —13 | —5 | —3.2 | +14 | +23 |
| Brittle Point, ° F | —71 | —85 | —59 | —33 | —27 | —25 |
| Volume Swell (percent) ASTM–D–471–49 "B" Method 70-30 isooctane:toluene, 48 hrs. at 180° F | 59 | 59 | 59 | 40 | 40 | 40 |

*Example XXI*

A curable plastisol of this invention was evaluated as a coating resin on nylon fabric. It was found that this coated fabric was flexible at —65° F. and that this property remained unchanged after heat aging 100 hrs. at 300° F. The coating formulation for this product was 100 parts poly(trimethylolpropane-ethylene neopentylene-azelate), 40 parts Geon 121 polyvinylchloride, 13 parts N,N'-bis-1,2-ethylenisosebacamide, 25 parts $TiO_2$ (Rutile), and 1 part N,N'-bis-(β-naphthyl) p-phenylene diamine (Agerite White).

*Example XXII*

A curable plastisol of this invention was compounded with antimony trioxide which resulted in a flameproof rubbery product. The composition of the flameproof plastisol is as follows: 100 parts poly (trimethylolpropane-ethylene neopentyleneazelate); 40 parts Exon 654 polyvinylchloride resin; 100 parts $Sb_2O_3$; 10 parts Cab-O-Sil (silica); 2 parts butylated bis-phenol-A (Agerite Superlite); 6.1 parts trisaziridinyl phosphine oxide. A lightweight nylon fabric when coated with this compound exhibited self-extinguishing properties.

*Example XXIII*

A plastisol composition was prepared using a carboxyl-terminated trimethylolpropane - neopentylene - sebacate polyester cured with N,N'-bis-ethylenisosebacamide as a part of the plasticizer system in a conventional polyvinylchloride plastisol. This particular composition offered several advantages over the conventional polyvinylchloride plastisol, such as greatly improved thermal stability, and superior abrasion resistance. These will be apparent from the following data:

| Composition: | Parts |
|---|---|
| Bakelite QYNV–X polyvinylchloride | 100 |
| Poly(neopentylene sebacate) | 70 |
| Tricresylphosphate | 60 |
| Hetron 19 (chlorine containing alkyd) | 30 |
| Dyphos | 5 |
| Agerite Superlite (butylated bis-phenol-A) | 1 |
| $Sb_2O_3$ | 75 |
| Ultra Sil VN–3 (silica) | 25 |
| N,N'-bis-ethylenisosebacamide | 20 |
| Red pigment | 5 |

TABLE VIII

[Abrasion resistance (Taber Abracer CS–17 wheel 1000 g. load)]

| Cured Plastisol | Conventional Plastisol |
|---|---|
| 1,500+ cycle to rupture first fiber. After heat aging 150 hrs. at 300° F. plus 2 hrs. at 350° F. | 400 cycles to rupture first fiber. |
| 600+ cycles to rupture first fiber | Coating so seriously degraded no test performed. |

The cured plastisol on nylon fabric was self-extinguishing. The conventional system was not.

*Example XXIV*

A solution of poly(trimethylolpropane-diethylene glycol-adipate), polyvinylchloride, and N,N'-bis-1,2-ethylenisosebacamide was found to be especially useful as an adhesive for coated fabrics. It was also found that this mixture when compounded with $Sb_2O_3$ and coated onto fabrics, such as nylon or Dacron, resulted in self-extinguishing coated fabrics.

*Example XXV*

A cured rubbery product comprising 100 parts of carboxyl-terminated poly(trimethylolpropane-neopentylene-sebacate) of molecular weight about 2,700 branched to the extent of 2.3 carboxyl branches per average molecule, was compounded with 10 parts of vinylidene fluorine-propylene hexafluoride elastomeric copolymer. This mixture was further compounded with 15 parts Cab-O-Sil (silica), 2 parts Agerite White, and 13.5 parts N,N'-bis-ethylenisophthalamide. This compound was coated onto glass braid, and cured for 15 minutes at 350° F. The resulting cured product was found to have excellent thermal stability, and excellent electrical properties. Also noted were good solvent resistance, and good abrasion resistance. This product is especially suited as an electrical insulator for high temperature applications.

It is believed that the cross-linking between the polyester and the curing agent is effected between the carboxyl radicals and the curing agent directly resulting in the curing agent itself linking the molecules of polyester together. For example, when curing with a polyalkylenamide, the cross-linking reaction and the resulting cross-linked composition may be diagrammatically illustrated as follows:

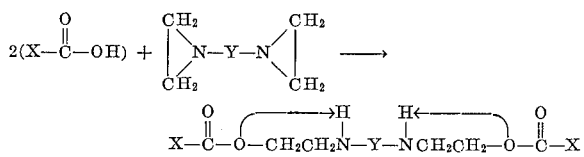

in which X is the remainder of the polyester molecule and Y is the remainder of the polyalkylenamide molecule. It is noted that the imine rings of the polyalkylenamide open up and a hydrogen atom is received from the carboxyl group to satisfy the free valence of the nitrogen atom as the result of opening of the imine ring. Numerous such links may result between the same or different molecules of polyester and polyalkylenamide.

As previously stated hereinbefore, the average molecular weight of the saturated polyester polymer is, generally, between about 700 and about 10,000 prior to cross-linking; however, higher molecular weight saturated polyester polymers are not necessarily excluded from this invention if the polyester polymer is a liquid at ambient temperature or can be liquefied by moderate heating to a temperature not higher than 60° C. To produce such low molecular weight or low viscosity polyester polymers, the organic monomers, including the diols, dibasic acids and the organic polyfunctional component, should each have molecular weights not higher than about 3000 or 4000, and preferably not higher than about 500.

Various alterations and modifications of the compositions and their uses may become obvious to those skilled in the art without departing from the scope of this invention.

Having described our invention, we claim:

1. A plastisol composition comprising a vinyl addition polymer capable of forming a plastisol and between about 30 and about 85 weight percent of a substantially completely condensed polymeric polyester of a polyhydric alcohol reactant, and an acidic reactant selected from the group consisting of polycarboxylic acids and polycarboxylic anhydrides, at least one of said reactants having at least three functional groups selected from the groups consisting of carboxyl group, carboxylic anhydride group and hydroxyl group, said polyester being liquid or liquefiable at a temperature of about 25 to about 50° C., having an acid content in the range of about 0.1 to about 3 milli-equivalents per gram, having a molecular weight not higher than about 10,000, containing an average of more than 2 carboxyl groups per molecule and being free from hydroxyl groups.

2. A plastisol composition comprising a vinyl addition polymer capable of forming a plastisol, a curing agent and between about 30 and about 85 weight percent of a substantially completely condensed polymeric polyester of a polyhydric alcohol reactant, and an acidic reactant selected from the group consisting of polycarboxylic acids and polycarboxylic anhydrides, at least one of said reactants having at least three functional groups selected from the groups consisting of carboxyl group, carboxylic anhydride group and hydroxyl group, said polyester being liquid or liquefiable at a temperature of about 25 to about 50° C., having an acid content in the range of about 0.25 to about 1.5 milli-equivalents per gram, having a molecular weight not higher than about 10,000, containing an average of more than 2.5 carboxyl groups per molecule and not more than about 15 carboxyl groups per molecule and being free from hydroxyl groups.

3. The plastisol composition of claim 2 in which the curing agent is a polyalkylenamide.

4. The cured composition of claim 2.

References Cited by the Examiner

UNITED STATES PATENTS

| | | | |
|---|---|---|---|
| 2,884,340 | 4/1959 | Loshaek | 260—857 |
| 2,933,416 | 4/1960 | Haakh et al. | 260—873 |

OTHER REFERENCES

Hill: High Molecular Weight Plasticizers for P.V.C., British Plastics, February 1959, vol. 32, pages 74–77 and 89.

MURRAY TILLMAN, *Primary Examiner.*

J. T. GOOLKASIAN, *Assistant Examiner.*

UNITED STATES PATENT OFFICE
CERTIFICATE OF CORRECTION

Patent No. 3,281,498                      October 25, 1966

Nathaniel L. Watkins, Jr., et al.

It is hereby certified that error appears in the above numbered patent requiring correction and that the said Letters Patent should read as corrected below.

Column 5, line 61, for "220° C." read -- 22° C. --; column 6, lines 25 and 30, for that portion of each formula reading

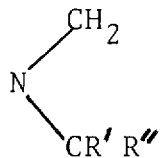        read        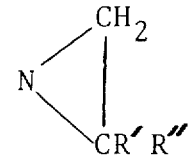

column 11, line 54, for "methylpropane" read -- methylolpropane --; column 14, line 22, for "(1)" read -- (2) --; column 16, line 19, for "Hyar" read -- Hycar --; column 20, line 15, insert the following: -- Evaluation of above coated on nylon fabric and cured 10 minutes at 350° F. --; line 59, for "fluorine" read -- fluoride --.

Signed and sealed this 5th day of September 1967.

(SEAL)
Attest:

ERNEST W. SWIDER                      EDWARD J. BRENNER
Attesting Officer                      Commissioner of Patents